(12) United States Patent
Kikuta et al.

(10) Patent No.: US 8,967,708 B2
(45) Date of Patent: Mar. 3, 2015

(54) VEHICLE SUNROOF APPARATUS

(71) Applicant: Aisin Seiki Kabushiki Kaisha, Kariya-shi, Aichi-ken (JP)

(72) Inventors: Takashi Kikuta, Kariya (JP); Takashi Kawato, Anjo (JP); Daisuke Yuasa, Toyoake (JP); Nobuyasu Bessho, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/089,475

(22) Filed: Nov. 25, 2013

(65) Prior Publication Data

US 2014/0145474 A1 May 29, 2014

(30) Foreign Application Priority Data

Nov. 27, 2012 (JP) ................................. 2012-258921

(51) Int. Cl.
*B60J 7/057* (2006.01)
*B60J 7/043* (2006.01)

(52) U.S. Cl.
CPC .............. *B60J 7/0435* (2013.01); *B60J 7/0573* (2013.01)
USPC .................. 296/223; 296/216.03; 296/216.05

(58) Field of Classification Search
CPC ................................ B60J 7/0435; B60J 7/0573
USPC ............................ 296/216.01–224; 49/26–28
See application file for complete search history.

(56) References Cited

U.S. PATENT DOCUMENTS

| | | | |
|---|---|---|---|
| 2003/0052636 A1 | 3/2003 | Okada et al. | |
| 2008/0238154 A1* | 10/2008 | Honjo et al. | 296/216.04 |
| 2012/0001458 A1 | 1/2012 | Sawada | |
| 2013/0147237 A1 | 6/2013 | Sawada | |

FOREIGN PATENT DOCUMENTS

| | | |
|---|---|---|
| JP | 2003-25854 | 1/2003 |
| JP | 2010-254180 | 11/2010 |
| JP | 2012-2039 | 1/2012 |

OTHER PUBLICATIONS

Extended European Search Report for European Appl. No. 13194308.6 dated Apr. 3, 2014.
Katsura, S. et al., "Vehicle Sun Roof Apparatus," U.S. Appl. No. 13/776,979, filed Feb. 26, 2013.

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A vehicle sunroof apparatus includes: a pair of first and second opening and closing drive units arranged in a widthwise direction, the pair of first and second opening and closing drive units each including: a rail extending in a fore-and-aft direction of a vehicle; a movable body provided so as to be movable on the rail; and a coupling mechanism configured to couple the movable body to a movable panel provided in a roof opening portion, and arranged at widthwise both end portions of the roof opening portion so as to be capable of opening and closing the movable panel; and a control device configured to control operations of the opening and closing drive units.

6 Claims, 7 Drawing Sheets

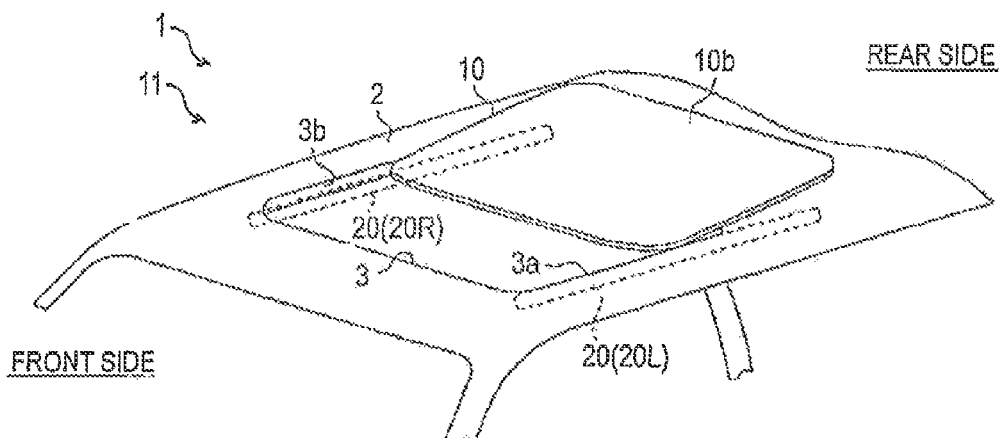
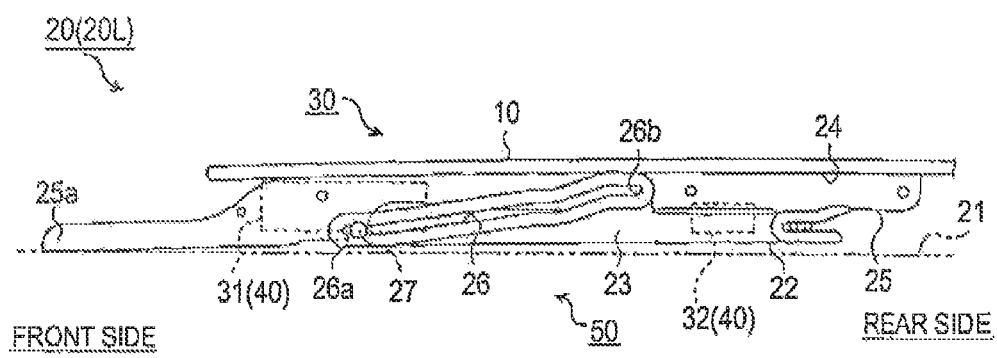
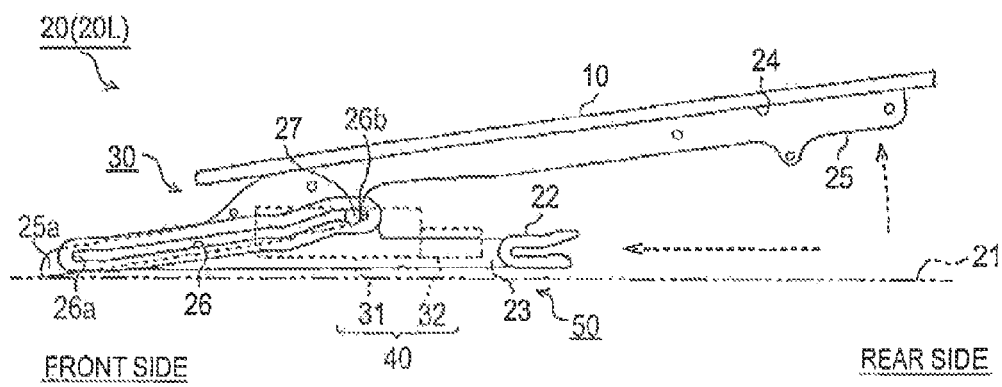

VEHICLE SUNROOF APPARATUS

CROSS-REFERENCE TO RELATED APPLICATIONS

This application is based on and claims priority under 35 U.S.C. §119 to Japanese Patent Application 2012-258921, filed on Nov. 27, 2012, the entire content of which is incorporated herein by reference.

TECHNICAL FIELD

This disclosure relates to a vehicle sunroof apparatus.

BACKGROUND DISCUSSION

In the related art, there is a vehicle sunroof apparatus configured to allow a movable panel provided in a roof opening portion to be opened and closed. For example, a sunroof apparatus disclosed in Japanese Patent No. 4858570 (Reference 1) is provided with a pair of left and right opening and closing drive units at widthwise both end portions of the roof opening portion. These opening and closing drive units each include a rail extending in the fore-and-aft direction of a vehicle, a movable body provided so as to be movable on the rail, and a coupling mechanism configured to couple the movable body to the movable panel. The coupling mechanism includes a tilt mechanism configured to tilt the movable panel in accordance with a relative position of the movable body moving on the rail, and a switching mechanism configured to switch the state between a tilting state in which the movable body is relatively movable with respect to the movable panel and a sliding state in which the movable panel moves integrally with the movable body.

Specifically, the tilt mechanism is configured to tilt up the movable panel in a form of lifting a rear end thereof on the basis of a forward movement of the movable body. At a forward position to which the movable panel is tilted up, a switching area in which the coupled state between the movable panel and the movable body is switchable by the switching mechanism is set. The switching mechanism switches the coupled state in the tilting state into the sliding state and switches the coupled state in the sliding state into the tilting state with the movable body moved to the switching area.

In other words, in the sunroof apparatus having the configuration as described above, if the movable panel is in a fully-closed state, the coupled states between the movable panel and the movable bodies of the respective opening and closing drive units are in the tilting state. In this tilting state, a tilting angle of the movable panel (tilt angle), that is, an amount of opening by the tilting operation may be adjusted by moving the movable bodies of the respective opening and closing drive units in the fore-and-aft direction of the vehicle.

The coupled state between the movable bodies and the movable panel is switched from the tilting state to the sliding state by moving the movable bodies of the respective opening and closing drive units to the switching areas. In this sliding state, the movable panel may be slid along a roof panel, that is, the amount of opening by the sliding operation may be adjusted in a state in which the movable panel is tilted up by moving the movable bodies of the respective opening and closing drive units in the fore-and-aft direction of the vehicle.

Furthermore, in this sliding state, the coupled state between the movable bodies and the movable panel is switched to the tilting state by moving the movable bodies of the respective opening and closing drive units again to the switching areas. Subsequently, the movable panel may be translated to the fully-closed state by moving the movable bodies of the respective opening and closing drive units rearward.

In this configuration, the limited rail length may be effectively used without dividing the rail into a tilting section and a sliding section. Accordingly, larger amounts of opening in a tilted state and in a slid state may be secured and, simultaneously, the movable panel may be opened and closed quickly without increasing the size of a motor, which corresponds to a drive source of the movable panel.

However, in a configuration in which the pair of left and right opening and closing drive units are provided at the widthwise both end portions of the roof opening, there is a case, for example, where misalignment of the positions of the movable bodies may occur between the two opening and closing drive units caused by rattling with respect to the rails. In other words, a state in which the coupled state between the movable body and the movable panel is switched at one of the left and right opening and closing drive units, but the switching of the coupled state is not completed in the other opening and closing drive unit may occur. If the directions of movement of the respective movable bodies are reversed in this state, lodging may occur in the opening and closing drive units by the opening and closing operations of the movable panel on the left side and the right side different from each other.

Reference 1 discloses a configuration in which an automatic area is set at a forward position including the switching area to control both of the opening and closing drive units automatically. In other words, in the automatic area, the movable bodies of both of the opening and closing drive units are moved to the switching area to switch the coupled states between the movable bodies and the movable panel without changing the opening and closing drive during execution, and then the direction of movement of both of the movable bodies is reversed to cause both of the movable bodies to leave the automatic area. During this time, a change (stop or reverse of the opening and closing operation) in the opening and closing operation by the operation input is not accepted, so that an event of an occurrence of lodging in the respective opening and closing drive units due to the unequal opening and closing operations of the movable panel between the left and the right is avoided in this configuration.

However, in the vehicle, there is a case where a power supply voltage is lowered depending on cranking of the engine, for example, whereby the above-described automatic control may not be continued any longer. In a case where the coupled state between the movable panel and the movable body is different between the left and right opening and closing drive units when starting the opening and closing drive again after the stop, the lodging may occur in the respective opening and closing drive units due to the reverse movement of the respective movable bodies when restarting the opening and closing drive after the stop of drive. Therefore, there is still a room for improvement in this respect.

SUMMARY

Thus, a need exists for a vehicle sunroof apparatus which is not suspectable to the drawback mentioned above.

A first aspect of this disclosure is directed to A vehicle sunroof apparatus including: a pair of first and second opening and closing drive units arranged in a widthwise direction, the pair of first and second opening and closing drive units each including: a rail extending in a fore-and-aft direction of a vehicle; a movable body provided so as to be movable on the rail; and a coupling mechanism configured to couple the movable body to a movable panel provided in a roof opening portion, and arranged at widthwise both end portions of the roof opening portion so as to be capable of opening and closing the movable panel; and a control device configured to control operations of the opening and closing drive units, wherein the coupling mechanism includes a tilt mechanism configured to tilt the movable panel in accordance with a relative position of the movable body moving on the rail, and a switching mechanism configured to switch a state between a tilting state in which the movable body is relatively movable with respect to the movable panel and a sliding state in which the movable panel moves integrally with the movable body, the tilt mechanism is configured to tilt up the movable panel on the basis of a forward movement of the movable body, the switching mechanism is configured to switch a coupled state between the movable body and the movable panel in the tilting state into the sliding state and switch the coupled state in the sliding state into the tilting state with the movable body moved to a switching area set at a forward position where the movable panel is tilted up, and the control device controls both of the opening and closing drive units so as to memorize the direction of movement of the movable body before the stop in a case where opening and closing drive is stopped and moves the movable body in the direction of movement before the stop at the time of restart of the opening and closing drive.

According to the configuration described above, even when the opening and closing drive of the movable panel by both of the opening and closing drive units is stopped in a state in which the coupled state between the movable body and the movable panel is switched in only one of the opening and closing drive units, an event that the coupled states between the movable body and the movable panel in the left and right opening and closing drive units are different from each other may be prevented. Accordingly, an occurrence of lodging in the opening and closing drive units may be avoided, and consequently, smooth opening and closing operations of the movable panel is achieved even at the time of restart after the stop of drive.

According to this disclosure, the movable panel may be opened and closed smoothly even at the time of restart after the stop of the opening and closing drive.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating schematic configuration of a sunroof apparatus;

FIGS. 2A and 2B are side views of the opening and closing drive units which constitute the sunroof apparatus;

DETAILED DESCRIPTION

Figure 3:
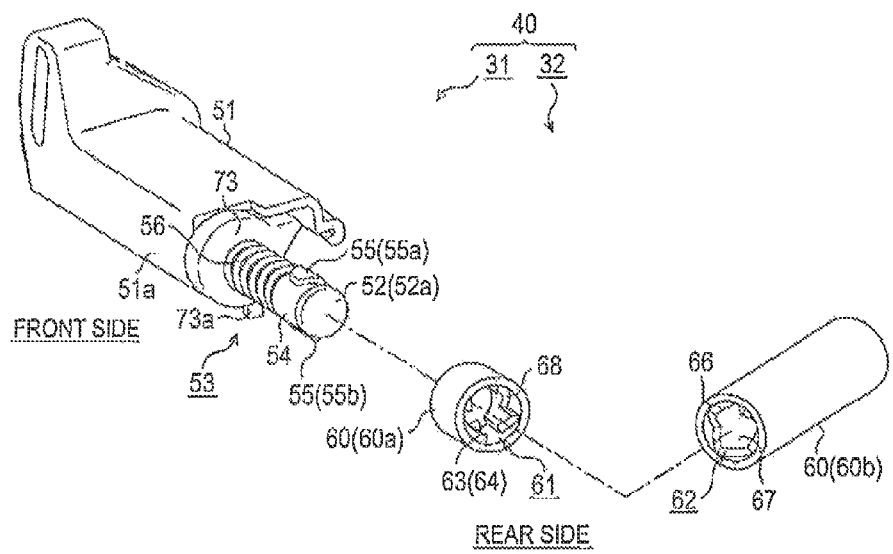
FIG. 3 is a perspective view of a switching mechanism provided in the opening and closing drive unit.

An embodiment disclosed here will be described with reference to the drawings.

As illustrated in FIG. 1, a roof panel 2 of a vehicle 1 is formed with a substantially rectangular-shaped roof opening portion 3. The roof opening portion 3 is provided with a substantially flat plate-shaped movable panel 10 which is configured to open and close the roof opening portion 3. The vehicle 1 is provided with a sunroof apparatus configured to cause the movable panel 10 to open and close by a motor (not illustrated) as a drive source.

Specifically, the sunroof apparatus 11 of the embodiment disclosed here is provided with a pair of left and right opening and closing drive units 20 (20L and 20R) which cause the movable panel 10 to open and close by being provided at widthwise both end portions 3a and 3b of the roof opening portion 3.

As illustrated in FIGS. 2A and 2B, the opening and closing drive unit 20 of the embodiment disclosed here includes a rail 21 extending in the fore-and-aft direction of the vehicle and a movable body 22 provided so as to be movable on the rail 21. In the embodiment disclosed here, the left and right opening and closing drive units 20L and 20R have the same configuration except for being a widthwise inverted configuration. Therefore, for the sake of convenience of description, only the opening and closing drive unit 20L on the left side is illustrated for description.

The movable body 22 of the embodiment disclosed here includes a side panel portion 23 having an elongated panel shape extending along the rail 21. A rear surface 24 of the movable panel 10 is provided with a supporting bracket 25 extending in the fore-and-aft direction of the vehicle. The opening and closing drive unit 20 of the embodiment disclosed here is configured to cause the movable panel 10 to open and close on the basis of the fore-and-aft movement of the movable body 22 along the rail 21 by coupling the side panel portion 23 of the movable body 22 to the supporting bracket 25 of the movable panel 10.

More specifically, the side panel portion 23 of the movable body 22 is formed with a guide hole 26 extending in the longitudinal direction, that is, in the fore-and-aft direction of the vehicle. The supporting bracket 25 of the movable panel 10 is provided with a guide pin 27 projecting outward in the width direction, thereby being inserted into the guide hole 26 of the movable body 22. The movable body 22 is movable relative to the movable panel 10 within a range of a sliding movement of the guide pin 27 in the guide hole 26 in appearance.

Specifically, the guide hole 26 of the embodiment disclosed here is provided with an inclination so that a rear end portion 26b is arranged at a higher level than a front end portion 26a. The supporting bracket 25 is configured to be slidable on the rail 21 and tiltable about the front end portion 25a as a supporting point by an engagement of the front end portion 25a with the rail 21. Accordingly, in the embodiment disclosed here, a tilt mechanism 30 configured to cause the movable panel 10 to tilt in accordance with the relative position of the movable body 22 which moves on the rail 21 in the fore-and-aft direction is formed.

In other words, as illustrated in FIG. 2A, the movable panel 10 of the embodiment disclosed here is arranged in substantially parallel to the rail 21 of the opening and closing drive unit 20 when being in a fully-closed state in which the roof opening portion 3 is fully closed. At this time, the guide pin 27 inserted into the guide hole 26 of the movable body 22 as described above is arranged at the front end portion 26a of the guide hole 26.

As illustrated in FIG. 2B, the movable body 22 moves on the rail 21 toward the front (left side in FIG. 2B), the guide pin 27 on the movable panel 10 moves within the guide hole 26 of the movable body 22 from the front end portion 26a toward the rear end portion 26b in appearance. Accordingly, a coupled point between the movable panel 10 and the movable body 22 moves upward, so that the movable panel 10 is tilted (tilt-up) in a form that a rear end 10b of the supporting bracket 25 moves upward.

The opening and closing drive unit 20 of the embodiment disclosed here further includes a first coupling member 31 provided on the movable panel 10, and a second coupling member 32 provided on the movable body 22. A relative movement of the movable body 22 with respect to the movable panel 10 is restricted by coupling between the first and second coupling members 31 and 32.

Specifically, in the embodiment disclosed here, the second coupling member 32 is configured to come into contact with the first coupling member 31 provided on the movable panel 10 at a forward position where the movable panel 10 is tilted up by a forward movement of the movable body 22. Also, in the embodiment disclosed here, a range which has a probability that the second coupling member 32 provided on the movable body 22 comes into contact with the first coupling member 31 provided on the movable panel 10 in a tilting state in which the movable body 22 moves relative to the movable panel 10 is set as a "switching area". The first coupling member 31 and the second coupling member 32 are configured to be coupled by the movement of the movable body 22 to the switching area.

In other words, the movable panel 10 moves on the rail 21 integrally with the movable body 22 by restricting the relative movement of the movable body 22 with respect to the movable panel 10 by the coupling between the first and second coupling members 31 and 32. Accordingly, in the embodiment disclosed here, the movable panel 10 is allowed to move (slide) back and force along the roof panel 2 in a state that the movable panel 10 is kept tilted up.

In the embodiment disclosed here, the coupling between the first and second coupling members 31 and 32 is released by the movement of the movable body 22 again to the switching area in a sliding state in which the movable panel 10 and the movable body 22 integrally move. Accordingly, a state in which the movable body 22 moving on the rail 21 moves relative to the movable panel 10 is achieved, so that the tilting state in which the movable panel 10 tilts in accordance with the relative position of the movable body 22 described above is restored.

In other words, in the embodiment disclosed here, the first and second coupling members 31 and 32 constitute a switching mechanism 40 configured to switch the coupled state between the movable panel 10 and the movable body 22 in the tilting state to that in the sliding state and switch the coupled state in the sliding state into that in the tilting state. The opening and closing drive unit 20 of the embodiment disclosed here is configured to open and close the movable panel 10 to on the basis of an operation of a coupling mechanism 50 composed of the switching mechanism 40 and the tilt mechanism 30.

As illustrated in FIG. 3, in the embodiment disclosed there, the first coupling member 31 is provided with a body portion 51 coupled to the supporting bracket 25 of the movable panel 10, and slidable on the rail 21. The body portion 51 is also provided with a rotating shaft 52 extending from a rear end portion 51a thereof rearward of the vehicle (see FIG. 2, rightward in FIG. 2), that is, in the direction of relative movement with respect to the second coupling member 32. The rotating shaft 52 is provided with a rotating cam 53 rotatably supported at a distal end thereof.

In contrast, the second coupling member 32 includes a substantially cylindrical shaped outline opening forward of the vehicle, that is, toward the first coupling member 31, and is provided on the movable body 22 at a position coaxial with the rotating cam 53. In other words, in the embodiment disclosed here, the rotating cam 53 of the first coupling member 31 is inserted into a cylinder of the second coupling member 32 by the forward movement of the movable body 22 in a switching area α. In the interior of the cylinder of the second coupling member 32, the second coupling member 32 and the rotating cam 53 engage and a disconnection of the rotating cam 53 is restricted, so that the first and second coupling members 31 and 32 are coupled so as to be integrally movable.

Figure 4A:
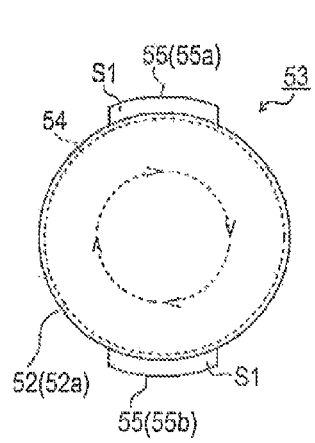
FIG. 4A is a front view of a rotating cam.

Specifically, as illustrated in FIG. 3 and FIG. 4A, the rotating cam 53 of the first coupling member 31 includes a substantially column shaped rotating cam body 54 rotatably supported at a position near the distal end of the rotating shaft 52, and a plurality of engaging projection 55 projecting radially outward from an outer periphery of the rotating cam body 54. Specifically, the rotating cam 53 of the embodiment disclosed here includes two engaging projections 55a and 55b provided on the outer periphery of the rotating cam body 54 at substantially equiangular intervals (substantially 180 intervals). Also, in the embodiment disclosed here, a disc-shaped flange 52a extending radially outward is formed at the distal end of the rotating shaft 52. Furthermore, a coil spring 56 is fitted on the rotating shaft 52 in a form that both ends thereof come into abutment with the body portion 51 and the rotating cam 53. The rotating cam 53 is configured to be retained in rotational position by being pressed against the flange 52a on the basis of a resilient force of the coil spring 56.

In contrast, as illustrated in FIG. 3, the second coupling member 32 includes a housing 60 coaxially coupling a first housing 60a and a second housing 60b both having a substantially cylindrical shape, and a first cam portion 61 and a second cam portion 62 formed in the housing 60.

Figure 4B:
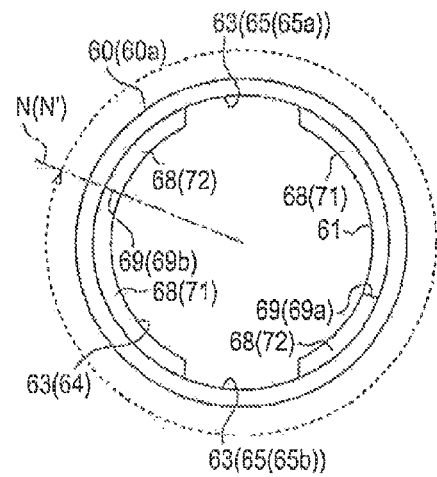
FIG. 4B is a back view of a first cam portion.

As illustrated in FIG. 3 and FIG. 4B, the first cam portion 61 is provided in the first housing 60a having an opening portion facing the first coupling member 31. The first cam portion 61 is formed with a through hole 63 which allows insertion of the rotating cam 53 of the first coupling member 31 by the forward movement of the movable body 22 as described above.

Specifically, the through hole 63 is made of a circular hole 64 having a diameter substantially equal to (slightly larger than) the diameter of the flange 52a provided at the distal end of the rotating shaft 52 and penetrating in the axial direction through the first cam portion 61 and a plurality of insertion grooves 65 extending in the axial direction so as to notch a peripheral edge portion of the circular hole 64. In the embodiment disclosed here, two insertion grooves 65a and 65b are formed on the peripheral edge portion of the circular hole 64 at substantially equiangular intervals (180° intervals). The rotating cam 53 is configured to be inserted into the through hole 63 of the first cam portion 61 in a form in which the rotating cam body 54 passes through the circular hole 64 and the engaging projections 55a and 55b pass through the respective insertion grooves 65a and 65b.

As illustrated in FIG. 3, the second cam portion 62 is arranged on the rear side of the first cam portion 61 (see FIG. 2, right side in FIG. 2, in the back of the interior of the cylinder of the housing 60) by being provided in the interior of the second housing 60b coupled to a rear end (portion illustrated in FIG. 4B) of the first housing 60a. The second cam portion 62 is formed with a cam surface 66 which causes the rotating cam 53 to rotate by coming into abutment with the rotating cam 53 inserted into the through hole 63 of the first cam portion 61 as described above.

Specifically, the second earn portion 62 of the embodiment disclosed here includes a circular hole 67 having a diameter substantially equal to (slightly larger than) the diameter of the flange 52a provided at the distal end of the rotating shaft 52 and penetrating through the second cam portion 62 in the axial direction in the same manner as the circular hole 64 of the first cam portion 61. The cam surface 66 is formed on a peripheral edge of the circular hole 67.

In other words, the cam surface 66 is provided at a position which comes into abutment with the engaging projections 55 (55a and 55b) of the rotating cam 53 inserted into the insertion hole 63 of the first cam portion 61. The cam surface 66 is configured to rotate the rotating cam 53 which comes into abutment therewith by a relative movement via the through hole 63 of the first cam portion 61 to a position at which the disconnection from the through hole 63 is not possible.

Figure 5:
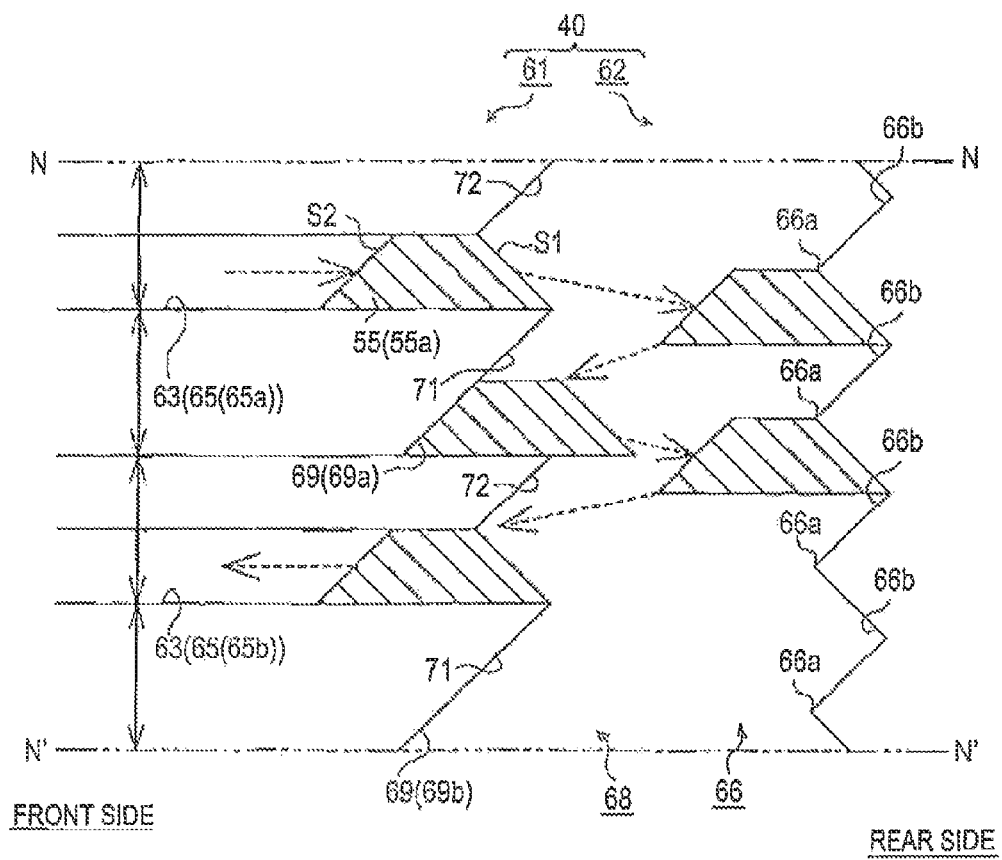
FIG. 5 is a developed view of the first cam portion and a second cam portion which constitute the switching mechanism.

More specifically, as illustrated in FIG. 5, in the embodiment disclosed here, the cam surface 66 is formed with a plurality of (four in the embodiment disclosed here) crest portions 66a projecting toward the first cam portion 61 opposing in the axial direction (the lateral direction in FIG. 5). Specifically, the crest portions 66a and trough portions 66b formed between the crest portions 66a are formed on a peripheral edge portion of the circular hole 67 at substantially equiangular intervals (substantially 90° intervals). The cam surface 66 of the embodiment disclosed here are formed with the respective crest portions 66a at positions shifted from the positions opposing the through hole 63 of the first cam portion 61.

For the sake of convenience of the description, only a trajectory of movement of one of the engaging projections 55 (55a) is illustrated in FIG. 5, and illustration of the other engaging projection 55 (55b) is omitted.

In other words, in the embodiment disclosed here, the engaging projections 55 (55a and 55b) of the rotating cam 53 moving rearward (rightward in FIG. 5) of the first cam portion 61 through the respective insertion grooves 65 (65a and 65b) which constitute the through hole 63 come into abutment with inclined portions between the crest portions 66a and the trough portions 66b on the cam surface 66 formed as described above in appearance. In the embodiment disclosed here, each of the engaging projections 55 are formed with an inclined surface S1 at a portion coming into abutment with the cam surface 66 so as to match the cam surface 66. As the respective engaging projections 55 coming into abutment with the cam surface 66 move from the crest portions 66a toward the trough portions 66b, the rotating cam 53 rotates to a rotational position where the respective engaging projections 55 cannot pass through the insertion grooves 65, that is, the position at which the disconnection from the through hole 63 of the first cam portion 61 is not possible.

Here, the second cam portion 62 of the embodiment disclosed here is provided at a position apart from the first cam portion 61 in the axial direction. Therefore, the rotating cam 53 is allowed to move between the first cam portion 61 and the second cam portion 62 in the axial direction in appearance by a relative movement between the first and second coupling members 31 and 32. The first cam portion 61 is provided with a cam surface 68 facing the cam surface 66 of the second cam portion 62.

In other words, in the switching mechanism 40 of the embodiment disclosed here, the rotating cam 53 moves away from the cam surface 66 of the second cam portion 62 by the relative movement of the first coupling member 31 on which the rotating cam 53 is provided and the second coupling member 32 on which the first cam portion 61 and the second cam portion 62 are provided in the direction away from each other, that is, by the movement of the movable body 22 rearward of the vehicle. Then, the rotating cam 53 moves in the direction getting closer to the first cam portion 61 in appearance, and hence comes into abutment with the cam surface 68 of the first cam portion 61.

The cam surface 68 is configured to cause the rotating cam 53 moving away from the cam surface 66 of the second cam portion 62 and coming into abutment with the cam surface 68 to rotate in the same direction as the cam surface 66 of the second cam portion 62, that is, in the direction in which the respective engaging projections 55 (55a and 55b) move further away from the respective insertion grooves 65 (65a and 65b) passed when being inserted into the through hole 63. In the embodiment disclosed here, each of the engaging projections 55 is formed with an inclined surface S2 at a portion coming into abutment with the cam surface 68 so as to match the cam surface 68. The cam surface 68 is formed with an engaging depression 69 configured to engage the rotating cam 53 which is further rotated by the abutment thereof.

Specifically, the cam surface 68 is provided with the engaging depressions 69 (69a and 69b) engageable with the respective engaging projections 55 (55a and 55b) of the rotating cam 53 between the respective insertion grooves 65 (65a and 65b) on the peripheral edge portion of the circular hole 64. In the embodiment disclosed here, the engaging depressions 69 (69a and 69b) are provided at positions away from the respective insertion grooves 66 (65a and 65b) in the circumferential direction by a predetermined angle (substantially 90°). The cam surface 68 includes a first guide portion 71 configured to guide the engaging projections 55 (55a and 55b) abutting therewith to an engaging position with respect to the engaging depressions 69 (69a and 69b). Accordingly, the first cam portion 61 is configured to retain the rotating cam 53 rotated to a rotational position at which the disconnection from the through hole 63 is not possible at the position at which the disconnection is not possible.

In the switching mechanism 40 of the embodiment disclosed here, the first coupling member 31 and the second coupling member 32 are coupled to each other in this manner, whereby the relative movement in the direction away from each other is restricted. Accordingly, the first and second coupling members 31 and 32 move integrally, and hence the coupled state between the movable panel 10 and the movable body 22 is switched from the tilting state to the sliding sate.

As illustrated in FIG. 3, the first coupling member 31 includes a rotation check 73 configured to be rotated by a rearward movement of the movable panel 10 integrally with the movable body 22 and engage the movable body 22 at an engaging projection 73a thereof. When the coupled state between the movable panel 10 and the movable body 22 is in the sliding state, the relative movement between the first coupling member 31 and the second coupling member 32 is restricted by the rotation check 73.

In addition, in the embodiment disclosed here, the rotation check 73 is configured to restore to a position at which the engaging projection 73a does not engage the movable body 22 by the movement of the movable body 22 again to the switching area α. Accordingly, when the movable body 22 is in the switching area α, the relative movement between the first coupling member 31 and the second coupling member 32 is allowed.

In other words, as illustrated in FIG. 5, the rotating cam 53 retained on (the engaging depression 69 of) the cam surface 68 of the first cam portion 61 at the rotational position at which the disconnection from the through hole 63 is not possible as described above moves away from the engaging depression 69 of the first cam portion 61 by the relative movement in the direction in which the first and second coupling members 31 and 32 get closer, that is, the forward movement of the movable body 22 in the switching area α. The rotating earn 53 moves in the direction getting closer to the second cam portion 62 (rightward in FIG. 5) in appearance and comes into abutment with the cam surface 66 of the second cam portion 62 again, whereby the respective engaging projections 55 (55a and 55b) rotate in the direction further away from the insertion grooves 65 (65a and 65b) through which the engaging projections 55 (55a and 55b) have passed at the time of insertion into the through hole 63.

Furthermore, the first coupling member 31 and the second coupling member 32 move away relative to each other in this state, that is, the movable body 22 moves rearward of the vehicle, whereby the rotating cam 53 moves away from the cam surface 66 of the second cam portion 62 and moves toward the first cam portion 61 (leftward in FIG. 5). The cam surface 68 of the first cam portion 61 includes a second guide portion 72 configured to guide the engaging projections 55 (55a and 55b) of the rotating cam 53 in abutment therewith by the axial movement thereof to the insertion grooves 65 (65a and 65b) on a side opposite to a side where the engaging projections 55 (55a and 55b) have passed at the time of insertion into the through hole 63. Accordingly, the cam surface 66 of the second cam portion 62 and the cam surface 68 of the first cam portion 61 cooperate to each other, so that the rotating cam 53 is allowed to be rotated to the position at which the disconnection form the through hole 63 is possible.

In the switching mechanism 40 of the embodiment disclosed here, the coupling between the first coupling member 31 and the second coupling member 32 is released in this manner, whereby the relative movement in the direction away from each other is allowed. Accordingly, the coupled state between the movable panel 10 and the movable body 22 is switched from the sliding state to the tiling state.

Subsequently, an electric configuration of the sunroof apparatus 11 of the embodiment disclosed here will be described.

Figure 6:
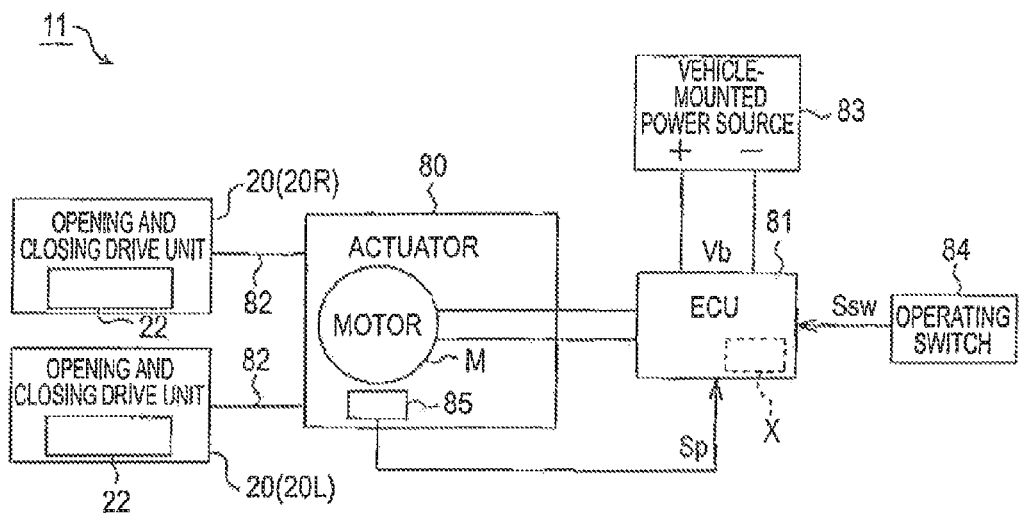
FIG. 6 is a block diagram illustrating a schematic configuration of the sunroof apparatus.

As illustrated in FIG. 6, the sunroof apparatus 11 of the embodiment disclosed here includes an actuator 80 driven by a motor M as a drive source, and an ECU 81 configured to supply drive power to the actuator 80. The opening and closing drive units 20 configured as described above are each configured in such a manner that the movable body 22 moves on the rail 21 on the basis of a drive force generated by the actuator 80.

Specifically, in the embodiment disclosed here, the drive force generated by the actuator 80 is transmitted to the left and right opening and closing drive units 20 (20L and 20R) via a power transmitting mechanism 82. The power transmitting mechanism 82 is configured by using a belt or a chain, for example. The ECU 81 supplies the drive power on the basis of a power supply voltage Vb of a vehicle-mounted power source (battery) 83 to the motor M. The ECU 81 as a control unit controls the operations of the opening and closing drive units 20 via the supply of the drive power to the motor M.

Specifically, the ECU 81 is configured to receive a supply of an output signal (operation input signal Ssw) of an operating switch 84 provided in a vehicle cabin, not illustrated. In the embodiment disclosed here, the actuator 80 is provided with a pulse sensor 85 configured to output a pulse signal Sp synchronous with the rotation of the motor M, and the pulse sensor 85 detects the moved positions of the movable bodies 22 on the rails 21 by counting (edges of) the pulse signal Sp. The ECU 81, then, controls the operations of the opening and closing drive units 20 on the basis of an operation input with respect to the operating switch 84 and the moved positions of the movable bodies 22.

Subsequently, a state of control of the opening and closing drive units 20 by the ECU 81 of the embodiment disclosed here will be described.

Figure 7:
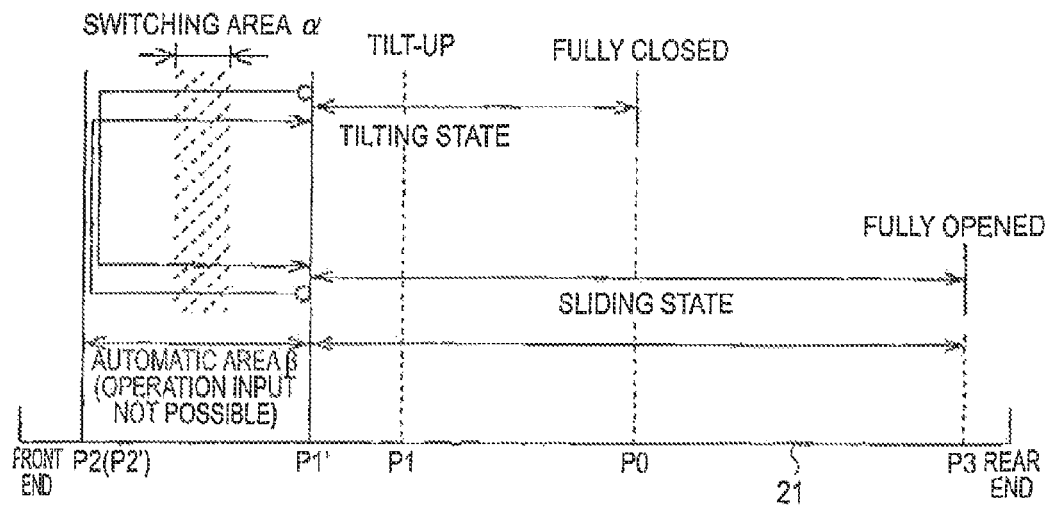
FIG. 7 is an explanatory drawing illustrating a control state of the opening and closing drive unit.

In the embodiment disclosed here, when in the tilting state in which the movable bodies 22 of the opening and closing drive units 20 move relative to the movable panel 10 (see FIG. 2A), the ECU 81 moves the movable bodies 22 forward on the basis of the operation input signal Ssw which requires an opening operation of the movable panel 10 as illustrated in FIG. 7. Also, the movable bodies 22 are moved rearward on the basis of the operation input signal Ssw which requires a closing operation of the movable panel 10. In this manner, the operations of the opening and closing drive units 20 are controlled so that the movable panel 10 is opened and closed by the tilting operation thereof.

In contrast, when in the sliding state in which the movable panel 10 and the movable bodies 22 move integrally (see FIG. 2B), the ECU 81 moves the movable bodies 22 rearward on the basis of the operation input signal Ssw which requires the opening operation of the movable panel 10. Also, the movable bodies 22 are moved forward on the basis of the operation input signal Ssw which requires the closing operation of the movable panel 10. In this manner, the operations of the opening and closing drive units 20 are controlled so that the movable panel 10 is opened and closed by the sliding movement thereof.

In the embodiment disclosed here, an automatic area β including the switching area α is set at a forward position at which the movable panel 10 is tilted up as described above. Specifically, the automatic area β extends forward and backward of the switching area α in a form of including the switching area α. While the movable bodies 22 are within the automatic area β, the ECU 81 of the embodiment disclosed here is configured to control both of the opening and closing drive units 20 automatically until the movable bodies 22 of both of the opening and closing drive units 20 leave the automatic area β without changing the opening and closing drive being executed.

Needless to say, the "opening and closing drive" in this case corresponds to either one of opening drive of the movable panel 10 by the "tilt-up & slide-open" or closing drive of the movable panel 10 by "slide-close & tilt down". A rear end position P1' of the automatic area β is set at a position forward of a position P1 at which the movable panel 10 is substantially completely tilted up.

In other words, the ECU 81 of the embodiment disclosed here moves the movable bodies 22 forward on the basis of the request of the opening operation via the operating switch 84 in a case where the movable bodies 22 of the opening and closing drive units 20 are at a rear position from a fully-closed position P0 of the movable panel 10 to the rear end position P1' of the automatic area β, and moves the movable bodies 22 rearward on the basis of the request of the closing operation. Then, the movable bodies 22 are moved rearward on the basis of the request of the opening movement via the operating switch 84 in a case where the movable bodies 22 of the opening and closing drive units 20 are at rear positions in a range from the rear end position P1' of the automatic area β to a fully opened position P3 of the movable panel 10, and moves the movable bodies 22 forward on the basis of the request of the closing movement.

The movable bodies 22 of the opening and closing drive units 20 (20L and 20R) enters the automatic area β, the movable bodies 22 are moved automatically forward until the coupled state with respect to the movable panel 10 is switched by the passage of the movable bodies 22 of both of the opening and closing drive units 20 through the switching area α. Subsequently, the movable bodies 22 are reversed in the direction of the movement so as to leave the automatic area β and are moved automatically rearward to the rear end position P1' of the automatic area β. In the embodiment disclosed here, a position P2 at which the direction of movements of the movable bodies 22 is reversed corresponds to the front end position P2' of the automatic area β.

In other words, in a case where the movable bodies 22 of the opening and closing drive units 20 (20L and 20R) are in the automatic area β, the ECU 81 of the embodiment disclosed here prevents the movable bodies 22 from moving reversely in a state in which the coupled state of only one of the left and right opening and closing drive units 20 is switched by not accepting the operation input via the operating switch 84. Accordingly, an occurrence of lodging in the opening and closing drive units 20 (20L and 20R) due to the unequal opening and closing operations of the movable panel 10 between the left and the right is avoided.

(Direction of Movement Retaining Control at the Time of Stop of Drive Due to Lowering of Power Supply Voltage and at the Time of Restart of Drive after Restoration of Power Supply Voltage)

Subsequently, a mode of the direction of movement retaining control at the time of stop of drive on the basis of lowering of the power supply voltage and at the time of restart of drive after a restoration of the power supply voltage executed by the ECU 81 of the embodiment disclosed here will be described.

As illustrated in FIG. 6, the ECU 81 of the embodiment disclosed here observes the power supply voltage Vb of the vehicle-mounted power source 83. In a case where the power supply voltage Vb is lowered to a level below a voltage required for supplying the drive power to the motor M of the actuator 80, specifically, in a case where the power supply voltage Vb is lowered to a predetermined voltage V1 set as a value which can hardly generate the stable drive force or lower, the opening and closing drive of the movable panel 10 by the opening and closing drive units 20 is stopped.

The ECU 81 continues to observe the power supply voltage Vb also after the drive control is stopped. Then, in a case where the power supply voltage Vb is restored to the voltage required for supplying the drive power, specifically, in a case where the power supply voltage Vb reaches a predetermined voltage V2 set as a value which allows the motor M to generate the stable drive force or higher, both of the opening and closing drive of the movable panel 10 by the opening and closing drive units 20 is restarted.

Here, in a case where the drive control of both of the opening and closing drive units 20 (20L and 20R) is stopped as described above, the ECU 81 of the embodiment disclosed here memorizes (stores) the direction of movements of the movable bodies 22 before the stop. Specifically, the ECU 81 of the embodiment disclosed here memorizes the direction of movements of the movable bodies 22 in a storage area X. The moved position of the detected movable body 22 is also memorized in the storage area X. When restarting the opening and closing drive, both of the opening and closing drive units 20 are controlled so as to move the movable bodies 22 in the direction of movement before the stop.

Figure 8:
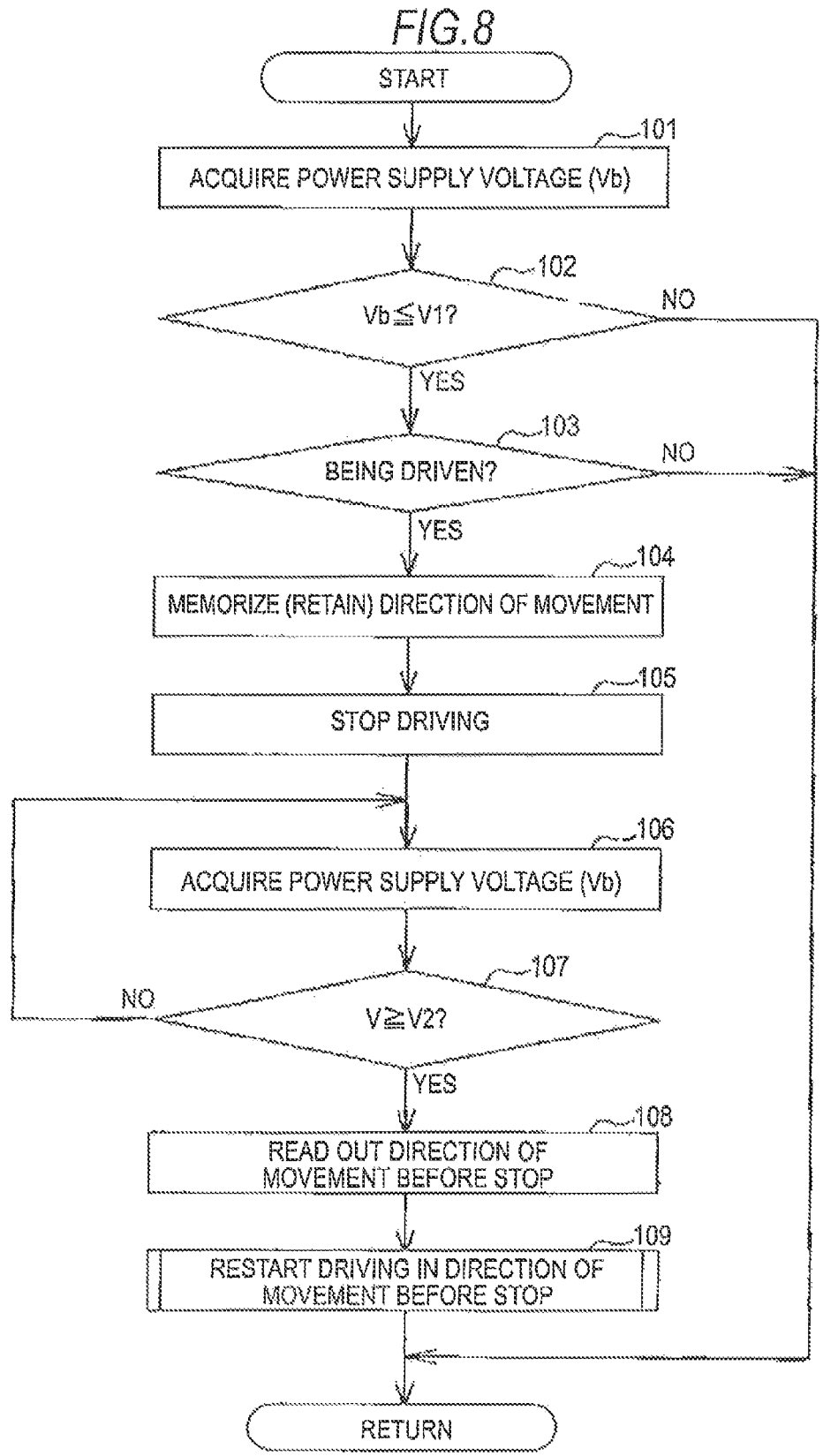
FIG. 8 is a flowchart illustrating a process procedure of direction of movement retaining control at the time of stop of drive due to lowering of a power supply voltage and at the time of restart of drive after a restoration of the power supply voltage.

Specifically, as illustrated in a flowchart in FIG. 8, when the ECU 81 acquires the power supply voltage Vb at a predetermined detection timing (Step 101), the ECU 81 subsequently determines whether or not the power supply voltage Vb is the predetermined voltage V1 or lower (Step 102). The ECU 81 determines whether or not both of the opening and closing drive units 20 are being driven (Step 103). If the opening and closing drive units 20 are being driven (Yes in Step 103), if both of the power supply voltage Vb is the predetermined voltage V1 or lower (Vb≤V1, Yes in Step 102), the direction of movements of the movable bodies 22 of both of the opening and closing drive units 20 is memorized (Step 104), and drive control of both of the opening and closing drive units 20 is stopped (Step 105).

After the stop of the drive control as well, the ECU 81 acquires the power supply voltage Vb at the predetermined detection timing (Step 106), and determines whether or not the power supply voltage Vb is the predetermined voltage V2 or higher (Step 107). When the power supply voltage Vb is restored to the predetermined voltage V2 or higher (Vb≥V2, Yes in Step 107), the direction of movement before the stop memorized in Step 104 is read out (Step 108), and the drive control of the opening and closing drive units 20 is restarted so as to move the movable bodies 22 in the direction of movement before the stop (Step 109).

In Step 102, if the power supply voltage Vb exceeds the predetermined voltage V1 (Vb>V1, No in Step 102), or if it is determined that both of the opening and closing drive units 20 are not being driven in Step 103 (No in Step 103), the ECU 81 does not execute the processes from Step 104 onward.

Subsequently, an operation of the sunroof apparatus 11 configured as described above will be described.

In other words, the opening and closing drive of the movable panel 10 by both of the opening and closing drive units 20 is stopped when the power supply voltage Vb for supplying the drive power to the motor M which corresponds to the drive source of both of the opening and closing drive units 20 is lowered to the predetermined voltage V1 or lower in the sunroof apparatus 11 of the embodiment disclosed here. Subsequently, if the power supply voltage Vb is restored to the predetermined voltage V2 or higher, the opening and closing drive of the movable panel 10 by both of the opening and closing drive units 20 is restarted. At this time, both of the opening and closing drive units 20 are controlled so that the movable bodies 22 move in the direction of movement before the stop.

As described above, according to the embodiment disclosed herein, the following advantages are achieved.

(1) The sunroof apparatus 11 includes the pair of left and right opening and closing drive units 20 (20L and 20R) configured to allow opening and closing drive of the movable panel 10 on the basis of the position of movements of the movable bodies 22 moving in the fore-and-aft direction of the vehicle on the rails 21, and the ECU 81 as the control device configured to control the operation of both of the opening and closing drive units 20. The opening and closing drive units 20 each includes the switching mechanism 40 configured to switch the coupled state between the movable body 22 and the movable panel 10 by the movement of the movable body 22 into the switching area α set at the forward position at which the movable panel 10 is tilted up. Also, in a case where the opening and closing drive of the movable panel 10 by the opening and closing drive units 20 is stopped, the ECU 81 memorizes the direction of movements of the movable bodies 22 before the stop. When restarting the opening and closing drive, the opening and closing drive units 20 are controlled so as to move the movable bodies 22 in the direction of movement before the stop.

In this configuration, even when the opening and closing drive of the movable panel 10 by both of the opening and closing drive units 20 is stopped in a state in which the coupled state between the movable bodies 22 and the movable panel 10 is switched in only one of both of the opening and closing drive units 20, a situation in which the coupled states are different between the left and right opening and closing drive units 20 (20L and 20R) may be prevented. Accordingly, an occurrence of lodging in the opening and closing drive units 20 may be avoided, and consequently, smooth opening and closing operations of the movable panel 10 is achieved even at the time of restart after the stop of drive.

(2) The ECU 81 observes the power supply voltage Vb for supplying the drive power to the motor M as the drive source of both of the opening and closing drive units 20. When the power supply voltage Vb is lowered to the predetermined voltage V1 or lower, the drive control of both of the opening and closing drive units 20 is stopped, and when the power supply voltage Vb is restored to the predetermined voltage V2 or higher, the drive control of both of the opening and closing drive units 20 is restarted.

In the configuration described above, the opening and closing drive of the movable panel 10 by both of the opening and closing drive units 20 is executed in the state in which the drive force can be generated stably. Consequently, the movable panel 10 may be opened and closed more smoothly. At the time of restart after the stop, smooth opening and closing operations of the movable panel 10 is achieved even at the time of restart after the stop of drive by controlling both of the opening and closing drive units 20 so as to move the movable bodies 22 in the direction of movement before the stop, and avoiding an occurrence of lodging in the opening and closing drive units 20.

(3) The switching mechanism 40 includes the first and second coupling members 31 and 32 configured to move relative to each other by the movement of the movable body 22 in the switching area α, and the coupled state between the movable body 22 and the movable panel 10 is switched by coupling and decoupling between the first and second coupling members 31 and 32. The first coupling member 31 includes the rotating cam 53 having the rotating shaft 52 extending in the direction of relative movement with respect to the second coupling member 32 and rotatably supported thereby. The second coupling member 32 includes the first cam portion 61 formed with the through hole 63 which allows insertion of the rotating cam by the forward movement of the movable body 22 in the switching area α, and the second cam portion 62 having the cam surface 66 configured to come into abutment with the rotating cam 53 inserted into the through hole 63 to cause the rotating cam 53 to rotate. The cam surface 68 of the first cam portion 61 is configured to change the rotational position of the rotating cam 53 coming into abutment with the cam surface 66 by being inserted into the through hole 63 to the position at which the disconnection from the through hole 63 is not possible. When the rotating cam 53 at the rotational position at which the disconnection is not possible comes into abutment with the cam surface 68 again by the forward movement of the movable body 22 in the switching area α, the cam surface 68 is configured to change the rotational position from the position at which the disconnection is not possible to a position at which the disconnection is possible.

In other words, in the switching mechanism 40 configured to mechanically switch the coupled state between the movable bodies 22 and the movable panel 10, an actual position at which the coupled state is switched by the movements of the movable bodies 22 in the switching area thereof is subjected to be shifted forward and backward. Therefore, remarkable advantages are achieved by applying the drive control as described in item (1) above to such a configuration.

The embodiment described above may be modified as follows.

In the embodiment disclosed here, the switching mechanism 40 includes the first coupling member 31 provided on the movable panel 10, and the second coupling member 32 provided on the movable body 22. Then, the coupled state between the movable body 22 and the movable panel 10 is switched by coupling and decoupling between the first and second coupling members 31 and 32. However, this disclosure is not limited thereto, and a configuration in which the first coupling member 31 is provided on the movable body 22, and the second coupling member 32 is provided on the movable panel 10 is also applicable.

Any configuration is applicable to the switching mechanism 40 as long as the coupled state in the tilting state can be switched into the sliding state and the coupled state in the sliding state can be switched into the tilting state by the movement of the movable body 22 into the switching area α set at the forward position where the movable panel 10 is tilted up. Specifically, a configuration in which the tilting state and the sliding state are switched by the configuration disclosed in Reference 1, for example.

The predetermined voltage V1 at which the drive control of both of the opening and closing drive units 20 is stopped and the predetermined voltage V2 at which the drive control is restarted may be set arbitrarily. For example, the values of the predetermined voltages V1 and V2 may be equalized or the "predetermined voltage V2 for restart" may be set to be higher than the "predetermined voltage V1 for stop".

In the embodiment disclosed here, the control of both of the opening and closing drive units 20 is performed to move the movable bodies 22 in the direction of movement before the stop at the time of restart or the opening and closing drive after the opening and closing drive of the movable panel 10 by both of the opening and closing drive units 20 is stopped due to the lowering of the power supply voltage Vb (Vb≤V1). However, this disclosure is not limited thereto, and a configuration in which the movable bodies 22 are moved in the direction of movement before the stop at the time of restart after the stop of drive in a case where the opening and closing drive of the movable panel 10 by both of the opening and closing drive units 20 is stopped due to other causes is also applicable.

In the embodiment disclosed here, the automatic area β including the switching area α is set at the forward position at which the movable panel 10 is tilted up. While the movable bodies 22 are within the automatic area β, the ECU 81 is configured to control both of the opening and closing drive units 20 automatically until the movable bodies 22 of both of the opening and closing drive units 20 leave the automatic area β without changing the opening and closing drive being executed. However, this disclosure is not limited thereto, and the direction of movement retaining control for moving the movable bodies 22 in the direction of movement before the stop at the time of restart after the drive stop as described above may be embodied in the configuration in which the automatic area β is not set as described above.

A configuration in which the direction of movement retaining control for moving the movable body 22 in the direction of movement before the stop is executed under the condition that the movable bodies 22 have been in a specific area including the switching area α before the stop of the opening and closing drive is also applicable.

Figure 9:
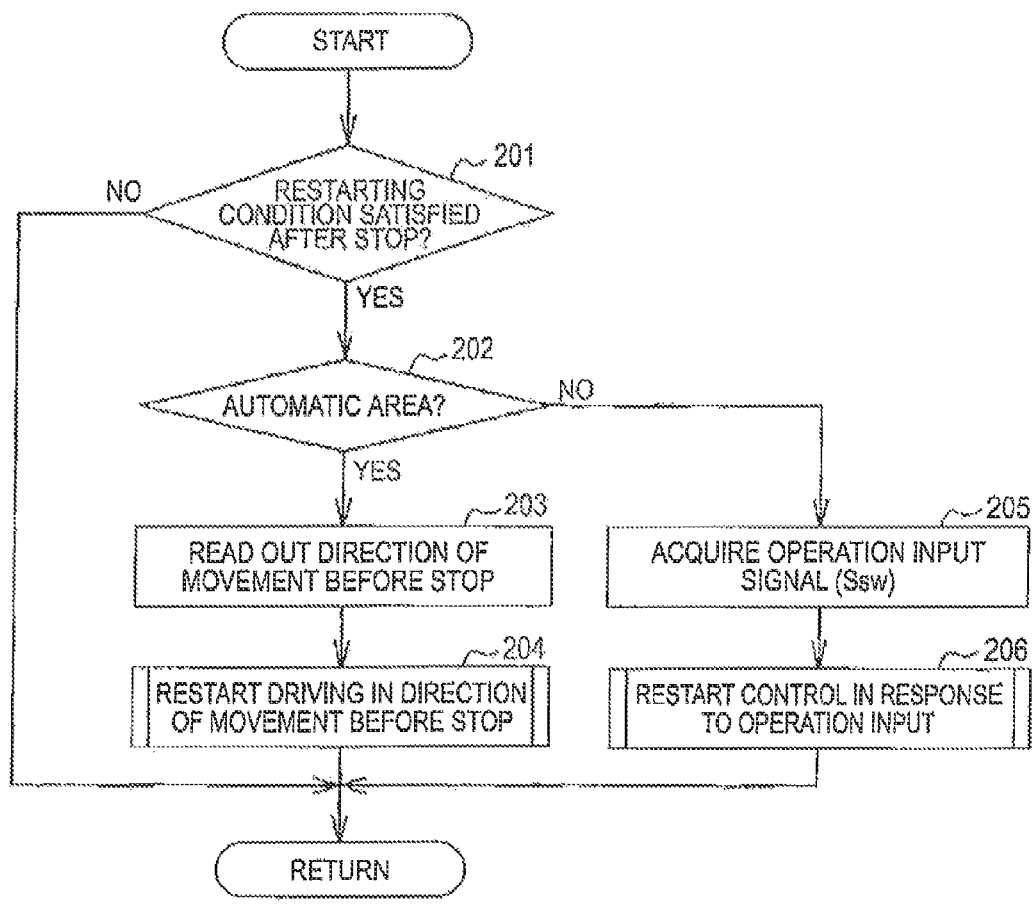
FIG. 9 is a flowchart illustrating another example of the direction of movement retaining control at the time of restart after the stop of the opening and closing drive.

For example, as illustrated in a flowchart in FIG. 9, in a case where a restarting condition is satisfied after the stop of the opening and closing drive (Yes in step 201), whether or not the movable bodies 22 of the opening and closing drive units 20 have been in the automatic area β before the stop of the opening and closing drive is determined (Step 202). When the movable bodies 22 have been in the automatic area β before the stop of the opening and closing drive (Yes in Step 202), the direction of movement before the stop memorized at the time of stop of the opening and closing drive is read out (Step 203), and the drive control of both of the opening and closing drive units 20 is restarted so as to move the movable bodies 22 in the direction of movement before the stop (Step 204).

In contrast, when the movable bodies 22 have not been in the automatic area β before the stop of the opening and closing drive in Step 202 (No in Step 202), the operation input signal Ssw is acquired (Step 205). Then, the drive control of both of the opening and closing drive units 20 is restarted on the basis of the operation input via the operating switch 84 (Step 206). In Step 201, when the restarting condition after the stop of the opening and closing drive is not satisfied (No in Step 201), the processes in Step 202 to Step 206 are not executed.

In this manner, by executing the direction of movement retaining control which moves the movable bodies 22 in the direction of movement before the stop at the time of restart of the opening and closing drive in a limited case where the difference in coupled state may occur in the left and right opening and closing drive units 20 (20L and 20R), generation of a sense of discomfort or lowering of operation flexibility due to the execution of the control may be suppressed. Then, such a specific area is not limited to the automatic area β and may be set arbitrarily.

In addition, the range of continuation of the direction of movement retaining control for moving the movable bodies 22 in the direction of movement before the stop at the time of restart after the stop of drive may be set arbitrarily. For example, the range may be from the switching of the coupled state after the movements of the movable bodies 22 to the switching area α by the execution of the automatic control within the automatic area β until the direction of movements of the movable bodies 22 are reversed. A configuration in which the direction of movement retaining control for moving the movable bodies 22 in the direction of movement before the stop is continued until a predetermined time is elapsed is also applicable. Then, a configuration in which the range of movement and the time limit are combined is also applicable.

A configuration in which the movable bodies 22 are moved in the direction of movement before the stop, that is, forward at the time of restart after the stop of drive in a limited case where the direction of movement before the stop is the forward movement is also applicable.

Figure 10:
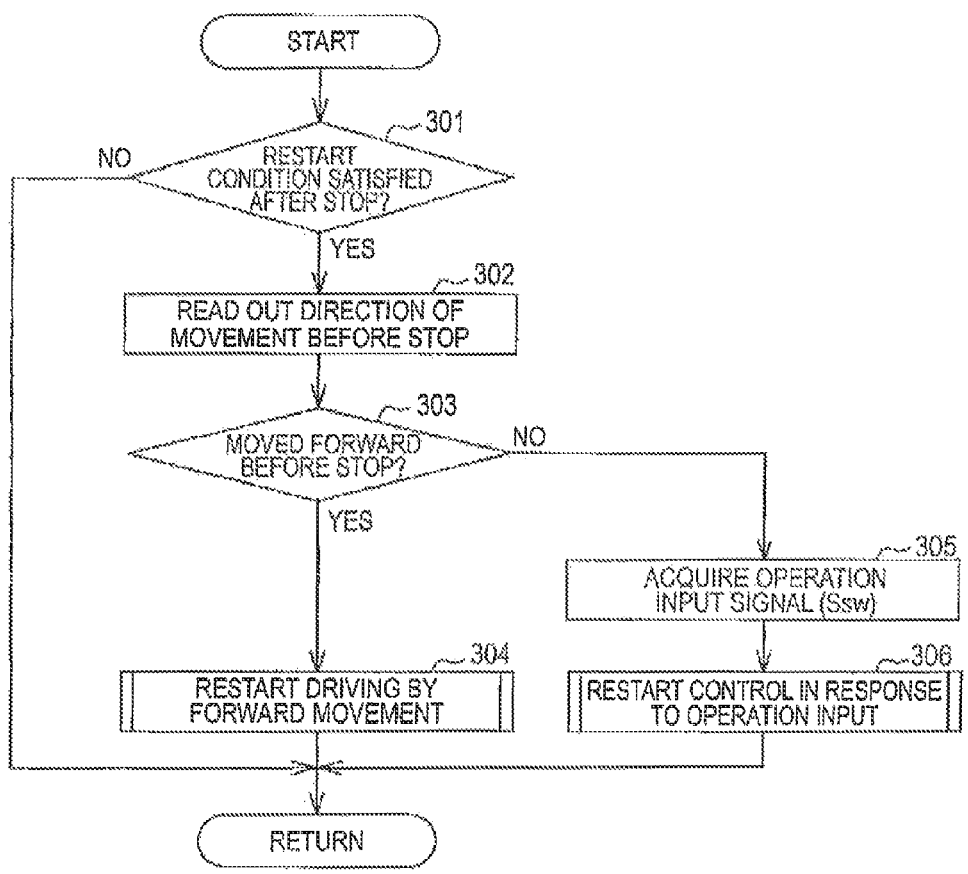
FIG. 10 is a flowchart illustrating another example of the direction of movement retaining control at the time of restart after the stop of the opening and closing drive.

For example, as illustrated in a flowchart in FIG. 10, in a case where the restarting condition is satisfied after the stop of the opening and closing drive is read out (Yes in step 301), the direction of movement before the stop memorized at the time of stop of the opening and closing drive (Step 302) and whether or not the direction of movement before the stop is the forward movement is determined (Step 303). Then, when the direction of movement before the stop is the forward movement (Yes in Step 303), the drive control of both of the opening and closing drive units 20 is restarted so as to move the movable bodies 22 forward (Step 304).

When the direction of movement before the stop of the opening and closing drive is a rearward movement in Step 3 (No in Step 303), the operation input signal Ssw is acquired (Step 305). Then, the drive control of both of the opening and closing drive units 20 may be configured to be restarted on the basis of the operation input via the operating switch 84 (Step 306).

In other words, if the switching of the coupled state between the movable panel 10 and the movable bodies 22 by the switching mechanism 40 is basically on the basis of the forward movements of the movable bodies 22, when the direction of movement before the stop of the opening and closing drive is the rearward movement, a probability of generation of a difference in coupled state between the left and right opening and closing drive units 20 is low at the time of restart of the opening and closing drive. Therefore, according to the configuration described above, an event in which the lodging occurs in the opening and closing drive units 20 may be avoided while suppressing the lowing of the operation flexibility and the generation of a sense of discomfort further effectively.

In the embodiment disclosed here, the cam surface 66 of the second cam portion 62 and the cam surface 68 of the first cam portion 61 are cooperated to rotate the rotating cam 53 to the position at which the disconnection from the through hole 63 is possible. However, this disclosure is not limited thereto, and a configuration in which the rotating cam 53 at the rotational position at which the disconnection is not possible is changed to the position at which the disconnection is possible solely by the cam surface 66 of the second cam portion 62. In the same manner, a configuration in which the rotating cam 53 which comes into abutment therewith by the relative movement via the through hole 63 of the first cam portion 61 is rotated to a position of engagement with the engaging depression 69 of the first cam portion 61 solely by the cam surface 66 of the second cam portion 62.

In the embodiment disclosed here, the rotating cam 53 includes the two engaging projections 55a and 55b provided on the outer periphery of the rotating cam body 54 at substantially equiangular intervals (substantially 180° intervals). The through hole 63 is formed with the two insertion grooves 65a and 65b formed at substantially equiangular intervals (180° intervals) corresponding to the engaging projections 55a and 55b. However, this disclosure is not limited thereto, and the number of the engaging projections on the rotating cam 53 and the number of the insertion grooves 65 in the through hole 63 may be changed arbitrarily. The shapes of the rotating cam 53 and the through hole 63 may also be changed arbitrarily within a range in which the rotating cam 53 and the through hole 63 serve as the switching mechanism 40.

In the embodiment disclosed here, the guide hole 26 is provided on the side of the movable body 22, and the guide pin 27 is provided on the (supporting bracket 25 of the) movable panel 10. However, this disclosure is not limited thereto, and a configuration in which the guide pin 27 is provided on the movable body 22 and the guide hole 26 is provided on the (supporting bracket 25 of the) movable panel 10 is also applicable (Reference 1).

In the embodiment described above, the opening and closing drive units 20 are configured in such a manner that the movable bodies 22 move on the rails 21 on the basis of the drive power generated by the actuator 80 having the motor M as the drive source. However, this disclosure is not limited thereto, and a configuration in which the opening and closing drive units 20 have the independent drive sources respectively is also applicable.

Subsequently, technical thoughts which can be understood from the embodiment described above and advantages thereof will be described.

(i) A vehicle sunroof apparatus wherein the control device controls both of the opening and closing drive units so as to move the movable bodies forward at the time of restart of the opening and closing drive if the movable bodies have moved forward before the stop of the opening and closing drive.

In other words, if the switching of the coupled state between the movable panel and the movable bodies by the switching mechanisms is basically on the basis of the forward movements of the movable bodies, when the direction of movement before the stop of the opening and closing drive is the rearward movement, the probability of generation of the difference in coupled state between the left and right opening and closing drive units is low at the time of restart of the opening and closing drive. Therefore, according to the configuration described above, the event in which the lodging occurs in the opening and closing drive units may be avoided while suppressing the wing of the operation flexibility and the generation of a sense of discomfort further effectively.

A first aspect of this disclosure is directed to A vehicle sunroof apparatus including: a pair of first and second opening and closing drive units arranged in a widthwise direction, the pair of first and second opening and closing drive units each including: a rail extending in a fore-and-aft direction of a vehicle; a movable body provided so as to be movable on the rail; and a coupling mechanism configured to couple the movable body to a movable panel provided in a roof opening portion, and arranged at widthwise both end portions of the roof opening portion so as to be capable of opening and closing the movable panel; and a control device configured to control operations of the opening and closing drive units, wherein the coupling mechanism includes a tilt mechanism configured to tilt the movable panel in accordance with a relative position of the movable body moving on the rail, and a switching mechanism configured to switch a state between a tilting state in which the movable body is relatively movable with respect to the movable panel and a sliding state in which the movable panel moves integrally with the movable body, the tilt mechanism is configured to tilt up the movable panel on the basis of a forward movement of the movable body, the switching mechanism is configured to switch a coupled state between the movable body and the movable panel in the tilting state into the sliding state and switch the coupled state in the sliding state into the tilting state with the movable body moved to a switching area set at a forward position where the movable panel is tilted up, and the control device controls both of the opening and closing drive units so as to memorize the direction of movement of the movable body before the stop in a case where opening and closing drive is stopped and moves the movable body in the direction of movement before the stop at the time of restart of the opening and closing drive.

According to the configuration described above, even when the opening and closing drive of the movable panel by both of the opening and closing drive units is stopped in a state in which the coupled state between the movable body and the movable panel is switched in only one of the opening and closing drive units, an event that the coupled states between the movable body and the movable panel in the left and right opening and closing drive units are different from each other may be prevented. Accordingly, an occurrence of lodging in the opening and closing drive units may be avoided, and consequently, smooth opening and closing operations of the movable panel is achieved even at the time of restart after the stop of drive.

A second aspect of this disclosure is directed to the vehicle sunroof apparatus described above, wherein a specific area including the switching area is set at a forward position at which the movable panel is tilted up, and the control device controls both of the opening and closing drive units so as to move the movable bodies in the direction of movement before the stop at the time of restart of the opening and closing drive if the movable bodies have been in the specific area before the stop of the opening and closing drive.

That is, by executing the direction of movement retaining control which moves the movable bodies in the direction of movement before the stop at the time of restart of the opening and closing drive only in a limited case where the difference in coupled state may occur in the left and right opening and closing drive units, generation of a sense of discomfort or lowering of operation flexibility due to the execution of the control is suppressed.

A third aspect of this disclosure is directed to the vehicle sunroof apparatus described above, wherein an automatic area including the switching area is set at the forward position at which the movable panel is tilted up, the control device controls both of the opening and closing drive units automatically so as not to change the opening and closing drive being executed when the movable bodies enter the automatic area, but to reverse the direction of movements of the movable bodies to cause the movable bodies to leave the automatic area after the coupled state is switched by the movements of the movable bodies into the switching area, and the specific area is the automatic area.

In the configuration described above, an event that the lodging occurs in the opening and closing drive units may be avoided while suppressing the generation of a sense of discomfort and the lowing of the operation flexibility further effectively.

A fourth aspect of this disclosure is directed to the vehicle sunroof apparatus described above, wherein the movable bodies move on the rails with a motor as a drive source, and the control device observes a power supply voltage, stops the opening and closing drive when the power supply voltage is lowered to a first predetermined value or lower, and restarts the opening and closing drive when the power supply voltage is restored to a second predetermined value.

In the configuration described above, the opening and closing drive of the movable panel by both of the opening and closing drive units is executed in a state in which a drive force can be generated stably. Consequently, the movable panel may be opened and closed more smoothly. At the time of restart after the stop, the smooth opening and closing operations of the movable panel is achieved even at the time of restart after the stop of the drive by controlling the opening and closing drive units so as to move the movable bodies in the direction of movement before the stop, and avoiding an occurrence of lodging in the opening and closing drive units.

A fifth aspect of this disclosure is directed to the vehicle sunroof apparatus described above, wherein the switching mechanism includes first and second coupling members configured to move relative to each other by the movement of the movable body in the switching area, and the coupled state between the movable body and the movable panel is switched by coupling and decoupling between the first and second coupling members, the first coupling member includes a rotating cam having a rotating shaft extending in the direction of relative movement with respect to the second coupling member and rotatably supported thereby, the second coupling member includes a through hole which allows insertion of the rotating cam by the forward movement of the movable body in the switching area, and a cam surface configured to come into abutment with the rotating cam inserted into the through hole to cause the rotating cam to rotate, and the cam surface is configured to change a rotational position of the rotating cam in abutment with the cam surface to a position at which a disconnection from the through hole is not possible by being inserted into the through hole, and is configured to change the rotational position from the position at which the disconnection is not possible to a position at which the disconnection is possible when the rotating cam at the rotational position at which the disconnection is not possible comes into abutment with the earn surface again by the forward movement of the movable body in the switching area.

In other words, in the switching mechanism configured to mechanically switch the coupling state between the movable body and the movable panel, an actual position at which the coupled state is switched by the movements of the movable bodies in the switching area thereof is subjected to be shifted forward and backward. Therefore, remarkable advantages are achieved by applying the direction of movement retaining control that moves the movable bodies in the direction of movement before the stop at the time of restart of the opening and closing drive to such a configuration.

A sixth aspect of this disclosure is directed to the vehicle sunroof apparatus described above, wherein the control device controls both of the opening and closing drive units so as to move the movable bodies forward at the time of restart of the opening and closing drive if the movements of the movable bodies are the forward movement's before the stop of the opening and closing drive.

In the configuration described above, an event in which lodging occurs in the opening and closing drive units may be avoided while suppressing the lowing of the operation flexibility and the generation of a sense of discomfort further effectively.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby

What is claimed is:

1. A vehicle sunroof apparatus comprising:
a pair of first and second opening and closing drive units arranged in a widthwise direction, the pair of first and second opening and closing drive units each including; a rail extending in a fore-and-aft direction of a vehicle; a movable body provided so as to be movable on the rail; and a coupling mechanism configured to couple the movable body to a movable panel provided in a roof opening portion, and arranged at widthwise both end portions of the roof opening portion so as to be capable of opening and closing the movable panel; and
a control device configured to control operations of the opening and closing drive units, wherein
the coupling mechanism includes a tilt mechanism configured to tilt the movable panel in accordance with a relative position of the movable body moving on the rail, and a switching mechanism configured to switch a state between a tilting state in which the movable body is relatively movable with respect to the movable panel and a sliding state in which the movable panel moves integrally with the movable body,
the tilt mechanism is configured to tilt up the movable panel on the basis of a forward movement of the movable body,
the switching mechanism is configured to switch a coupled state between the movable body and the movable panel in the tilting state into the sliding state and switch the coupled state in the sliding state into the tilting state with the movable body moved to a switching area set at a forward position where the movable panel is tilted up, and
the control device controls both of the opening and closing drive units so as to memorize the direction of movement of the movable body before a stop in a case where opening and closing drive is stopped and moves the movable body in the direction of movement before the stop at the time of restart of the opening and closing drive.

2. The vehicle sunroof apparatus according to claim 1, wherein
a specific area including the switching area is set at a forward position at which the movable panel is tilted up, and
the control device controls both of the opening and closing drive units so as to move the movable bodies in the direction of movement before the stop at the time of restart of the opening and closing drive if the movable bodies have been in the specific area before the stop of the opening and closing drive.

3. The vehicle sunroof apparatus according to claim 2, wherein
an automatic area including the switching area is set at the forward position at which the movable panel is tilted up,
the control device controls both of the opening and closing drive units automatically so as not to change the opening and closing drive being executed when the movable bodies enter the automatic area, but to reverse the direction of movements of the movable bodies to cause the movable bodies to leave the automatic area after the coupled state is switched by the movements of the movable bodies into the switching area, and
the specific area is the automatic area.

4. The vehicle sunroof apparatus according to claim 1, wherein
the movable bodies move on the rails with a motor as a drive source, and
the control device observes a power supply voltage, stops the opening and closing drive when the power supply voltage is lowered to a first predetermined value or lower, and restarts the opening and closing drive when the power supply voltage is restored to a second predetermined value.

5. The vehicle sunroof apparatus according to claim 1, wherein
the switching mechanism includes first and second coupling members configured to move relative to each other by the movement of the movable body in the switching area, and the coupled state between the movable body and the movable panel is switched by coupling and decoupling between the first and second coupling members,
the first coupling member includes a rotating cam having a rotating shaft extending in the direction of relative movement with respect to the second coupling member and rotatably supported thereby, the second coupling member includes a through hole which allows insertion of the rotating cam by the forward movement of the movable body in the switching area, and a cam surface configured to come into abutment with the rotating cam inserted into the through hole to cause the rotating cam to rotate, and the cam surface is configured to change a rotational position of the rotating cam in abutment with the cam surface to a position at which a disconnection from the through hole is not possible by being inserted into the through hole, and is configured to change the rotational position from the position at which the disconnection is not possible to a position at which the disconnection is possible when the rotating cam at the rotational position at which the disconnection is not possible comes into abutment with the cam surface again by the forward movement of the movable body in the switching area.

6. The vehicle sunroof apparatus according to claim 1, wherein the control device controls both of the opening and closing drive units so as to move the movable bodies forward at the time of restart of the opening and closing drive if the movements of the movable bodies are the forward movements before the stop of the opening and closing drive.

* * * * *